Patented Jan. 22, 1929.

1,699,727

UNITED STATES PATENT OFFICE.

ARCHIE J. WEITH, OF EVANSTON, ILLINOIS, ASSIGNOR TO BAKELITE CORPORATION, OF NEW YORK, N. Y., A CORPORATION OF DELAWARE.

PHENOLIC CONDENSATION PRODUCTS AND PROCESSES OF MAKING SAME.

No Drawing. Application filed May 25, 1923, Serial No. 641,511. Renewed April 11, 1928.

This invention relates to the manufacture of phenolic condensation products, and more especially products of the transparent infusible type. The object of the invention is the provision of a process whereby such products may be prepared readily, cheaply and if desired in large batches; the transparent products moreover possess excellent dielectric qualities, a bright amber color, machine well, and are susceptible of a very high polish. My invention comprises also certain novel products as below described.

As is now well understood in this art phenolic condensation products of the infusible type may be prepared by the direct combination in suitable proportions of phenols and methylene-containing bodies, such as formaldehyde or hexamethylenetetramine. While the proportions may be varied somewhat according to the qualities desired in the product, they are usually approximately equimolecular. If the phenolic body be present in decided excess, and especially if an acid catalyzer be used, the condensation product is of the permanently fusible resinous type; and these last-mentioned fusible resins may be transformed into the infusible resins by reacting thereon with such proportion of hexamethylenetetramine, or of formaldehyde, as will restore the substantially equimolecular proportion between the phenol and methylene groups.

These infusible transparent resins, whether prepared directly in one operation, or indirectly by reacting on the fusible resins with additional methylenes, are apt to exhibit in thick layers a reddish or orange tint which is discharged by sufficiently prolonged heating, being probably due to particles of colloidal size as disclosed in a prior Patent No. 1,310,088, patented July 15, 1919. It is characteristic of the transparent resins made by the present process from purified phenols that they have a bright amber color, being quite free from this orange tint.

According to the present invention in its preferred embodiment there is first prepared a phenolic resin of the permanently fusible type. This pre-formed resin is then treated with a further quantity of a phenol, after which a quantity of methylene groups at least sufficient to restore the substantially equimolecular proportion is introduced. The resulting potentially reactive composition may be hardened by sufficient application of heat, either in presence or absence of filling materials or the like.

Following is a typical example when a transparent resin of the infusible type is to be prepared from phenol. It is to be understood however that the present process is not restricted to the particular proportions given by way of example; nor is it limited to the preparation of transparent condensation products since when suitable fillers or inert materials are incorporated with the mass the process is applicable to the preparation of molding mixtures or the like. Similarly it may be used in conjunction with suitable solvents for the manufacture of varnishes and other solutions, impregnating liquids and the like.

A phenolic resin of the permanently fusible and soluble type is first prepared in well-understood manner, using the approximate ratio of 7.5 phenol groups to 6.0 methylene groups, preferably with an acid catalyzer. This resin is thoroughly washed with water until the catalyzer is substantially removed. It is then dried at a temperature sufficient for the removal of water and volatile products, and may be tested or analyzed to determine the precise phenolmethylene ratio. My invention is not restricted however to the use of fusible phenolic resins prepared in any particular manner.

Phenol is then added and incorporated by thorough stirring. The amount of phenol thus added may be varied rather widely (with corresponding adjustment of the amount of methylene body introduced in the succeeding stage) but it is preferred to introduce it in such quantity as to establish a ratio in the resulting mix of about 9-12 phenol groups to 6 methylene groups.

To this mixture is added a methylene-containing body, such as a solution of formaldehyde, in an amount sufficient to restore the proportions suitable for the infusible product. As stated above, these proportions are approximately equimolecular, or in a specific instance where a transparent product was desired, 6.4 phenol groups to 6 methylene groups. In conjunction with the formaldehyde it is preferred to introduce a basic catalyzer, preferably ammonia, either as such or directly in the form of hexamethylenetetramine, hexamethylenetetramine-tri-phenol or the like, in proportion equal to about 0.1 percent by weight of the dry resin.

The resulting mixture is thoroughly stirred, poured into molds, and permitted to stand at about 40° C. After hardening to a firm jelly it is removed from the molds and placed on drying racks in heated kilns, where it slowly hardens to a solid hard mass, which may be sawed, cut, ground and otherwise fabricated into any desired form.

Instead of phenol, cresols or cresol mixtures or other phenolic bodies may of course be used. While the invention possesses special advantages in its application to the preparation of transparent resins, it is as already stated not limited thereto.

It will be observed that in accordance with the present invention there is first admixed with the pre-formed fusible phenol resin sufficient phenol, cresol or other phenolic body to establish a decided excess of phenolic to methylene groups, say 9–12 phenolic groups to 6 methylene groups. To this mixture is added sufficient methylene-containing body, as formaldehyde or its equivalents, to establish in the mass a 1:1 ratio between phenolic and methylene groups, or such approximation to this ratio as will yield a potentially reactive composition; that is to say a composition which may be transformed by application of sufficient heat into a resinous product of the infusible type. The ratios stated above are understood to be rather flexible, and the invention includes all such approximations to these ratios as will accomplish the essential objects of the invention.

Instead of formaldehyde and hexamethylenetetramine, I may use equivalent bodies of aldehyde nature or derivation which react similarly with phenols, including acetaldehyde, furfuraldehyde, benzaldehyde and the like, or mixtures of these with formaldehyde.

I claim:

1. Process of making a phenolic condensation product comprising commingling a pre-formed phenol-methylene resin of the fusible type and a phenolic body, and incorporating with the mixture sufficient methylene-containing body to provide a higher ratio of methylene to phenol than existed in the fusible resin, thereby producing a reactive composition transformable by sufficient heat to an infusible product.

2. Process of making a phenolic condensation product comprising commingling a pre-formed phenol-methylene resin of the fusible type with sufficient phenolic body to provide about 9–12 phenolic groups for every 6 methylene groups; and then incorporating sufficient methylene-containing body to establish an approximately 1:1 ratio between the phenolic and methylene groups, thereby producing a reactive composition transformable by sufficient heat to an infusible product.

3. A potentially reactive composition comprising a pre-formed fusible phenol-methylene resin, sufficient added phenolic body to provide about 9–12 phenolic groups for every 6 methylene groups, and sufficient methylene-containing body to establish an approximately 1:1 ratio between the total phenolic and methylene groups in the mass.

4. An infusible phenolic condensation product resulting from the reaction of a pre-formed fusible phenol-methylene resin, sufficient added phenolic body to provide about 9–12 phenolic groups for every 6 methylene groups, and sufficient methylene-containing body to establish an approximately 1:1 ratio between the total phenolic and methylene groups.

In testimony whereof I affix my signature.

ARCHIE J. WEITH.